Aug. 3, 1954 J. LA VIA 2,685,609
COLOR TELEVISION
Filed April 21, 1952
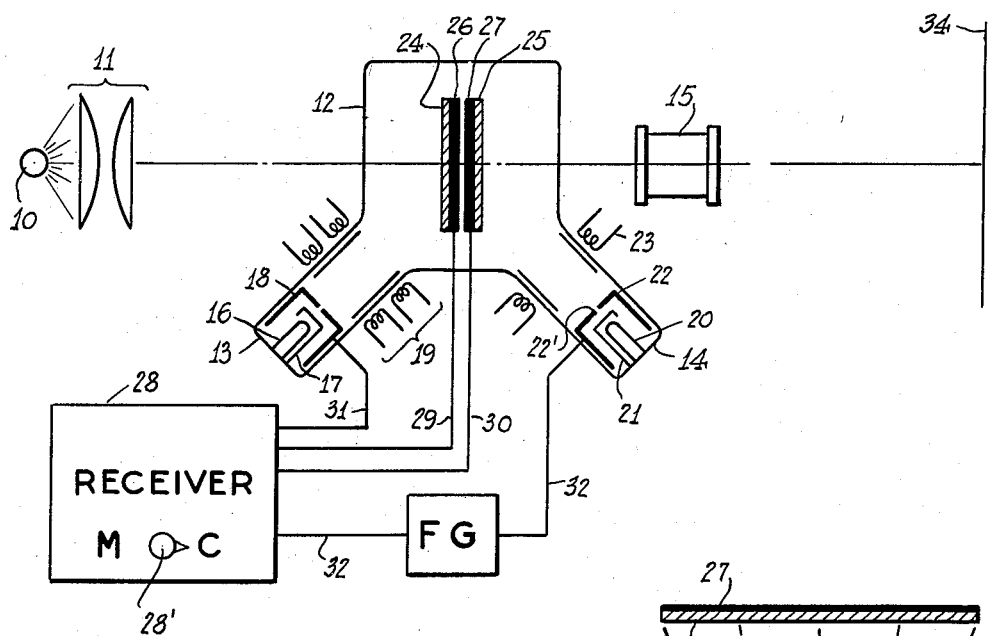
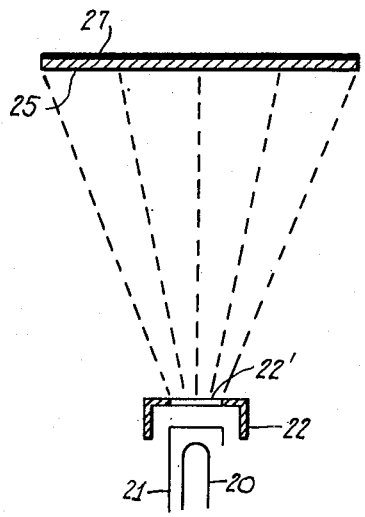
INVENTOR.
JOSEPH LA VIA.
BY Percy Freeman
ATTORNEY.

Patented Aug. 3, 1954

2,685,609

UNITED STATES PATENT OFFICE 2,685,609

COLOR TELEVISION

Joseph La Via, Ridgewood, N. Y.

Application April 21, 1952, Serial No. 283,382

7 Claims. (Cl. 178—5.2)

The present invention relates generally to methods and means to reproduce in natural colors a televised scene containing objects of various colors. More particularly, it pertains to a novel system wherein the synthesized image is projected onto a large viewing screen such as used in theatres, auditoriums, etc.

In general, it is proposed to use in an arc light projection system a single cathode ray tube which employs a pair of alkali halide screens, one of said halides serving as a black and white image reproducing screen and its associated halide being capable of effecting color variation under control of a broad scanning cathode ray beam cyclically varied in three different frequency periodicities to obtain of the light directed through the two screens chromatic values representative of the three primary colors required in the reproduction of natural colored television images.

It is an object of the present invention to provide in an image reproducing tube a pair of alkali halide target screens, one halide serving as a monochrome image-reproducing screen and the associated halide serving as a color separation medium to substract light of different wave lengths from white light directed therethrough.

Another object is the inclusion of said tube in the optical axis of an arc light projection system to project colored images onto a spatially positioned viewing screen.

Another object is the reproduction of monochrome images in one of said halides and utilizing the associated halide to impart colors to said images and directing the colored images onto a spatially positioned viewing screen.

In the drawings:

Fig. 1 represents diagrammatically one embodiment of a television receiver according to the present invention.

Fig. 2 represents diagrammatically a detail of the control electrode.

Fig. 3 represents diagrammatically a sectional view of the control electrode and the color separation screen.

Certain transparent crystals when subjected to an excitation medium such as a suitably modulated scanning cathode ray beam impinging upon the target surface of an alkali halide screen, will effect on the anode surface of the screen, variable density elemental areas analogous to the sensitometry of photographic materials when acted upon by light or other radiant energy. These areas are presumed to be produced by the electrons of the scanning beam entering the halide, or electrons released from the crystal lattice of the halide anion or both and tend to absorb energy from light incident to the halide crystal screen.

For example, the screen may be comprised of a crystalline structure of any alkali metal halide, in this instance, potassium chloride; other alkali halide screens may be constructed from the bromides, chlorides, fluorides and iodies of lithium, sodium, potassium, rubidium, caesium and virginium, these elements being commonly referred to as "the most electro-positive group," their atoms showing the greatest tendency to lose electrons. Other suitable combinations may be used, which in general are termed ionic crystals.

On the distal side of the crystal screen there has been spattered or evaporated a transparent metal coating to which is applied a suitable positive potential to control the speed of the electrons through the lattice toward the coating or anode and then disappear, thus creating a storage effect in the overall image.

Alternatively, this screen may be utilized to obtain coloration from white light directed therethrough. A beam of white light is directed normal to a projection type of image tube and incident to the halide screen contained therein. Color separation is obtained by a suitably pulsed broad electron beam extending from one end of the screen to the opposite end in a horizontal line and preferably covering two scan lines. The beam is repeatedly scanned vertically upwardly over the target surface and chromatic values representative of the three primary colors will be subtracted from the light beam.

By cyclically changing the frequency periodicity impingements of this scanning beam to effect cyclically the release of different groups of electrons within the crystal in differently spaced bands during successive scansions of the target surface, it will produce of the beam of white light, different resultant chromatic effects on corresponding areas of the anode surface. In this manner, specific color values are subtracted from the total sum of the chroma contained in the light beam.

The vertical scanning electron beam is cyclically impressed with a different frequency periodicity in N successive levels, i. e. the beam is pulsed or interrupted at N different periodicities, one different order of periodicity for each level, to cyclically produce N1—N2—N3 orders of spaced electrons respectively within the crystal. In each case, the free electrons are drawn to the anode and disappear.

For example, at frequency periodicity $P_1$, the scanning beam will cause the crystal to emit on the anode surface, light of a suitable wave length, in this instance the hue of red. At P2, the resultant hue will be green, and at P3, the wave length will be of the blue value.

The electron beam under control of P1, impinging upon the bottom of the halide screen causes to be released therein N1 electrons in spaced bands in accordance with the periodicity impingements, thus causing light wave interference. As the beam traverses upwardly, successive areas become similarly activated and in this instance resulting in the emergent spectral hue of red.

Upon the completion of the scansion for the red, the passive beam returns to its starting position and under control of P2, it repeats the scanning cycle; series of groups of differently spaced electrons N2, are released within the crystal, thus creating light interference of a different order, to obtain in this instance the emergent hue of green.

Again the beam returns to its starting position and under control of P3, it traverses the screen; series of groups of differently spaced electrons N3, are released therethrough thus creating light interference of another order, resulting in this instance, the emergent hue of blue.

This cycle of scanning is thereafter repeated in an orderly manner to selectively permit, by means of the three orders of light wave interferences, the passage therethrough of portions of the white light resulting in the hues of the three primary colors.

Fig. 1 illustrates the various elements of the system; white light from a source 10 is formed into a beam of light by the condensers 11, and thence directed through a projection type of cathode ray tube 12. This tube has two opposed electron guns 13 and 14. The electron gun 13 has the elements common to a cathode ray tube, such as a filament heater 16, cathode 17, and control electrode 18. The scanning of the electron beam is accomplished by the coils 19 or other suitable means.

The electron gun 14 contains a filament heater 20, cathode 21, and a control electrode 22. This electrode 22 has a horizontal narrow elongated aperture 22' such that a triangular cathode ray beam is formed within the tube. This beam is caused repeatedly to scan upwardly by means of the coil 23.

Positioned within the tube 12, are two alkali halide target screens 24, 25, each having a transparent metal anode 26, 27, respectively, and a suitable positive potential from a receiver 28, is applied to each anode by conductors 29, 30.

The screen 24 and its anode 26 is employed as a monochrome or black and white television image reproducing screen and is scanned from the bottom to the top in the conventional cyclic scanning sequences utilized in color television. For each color phase, i. e., for the red, green and blue, groups of variable density elemental areas are created in the alkali halide 24, and a composite image in black and white is formed on the anode surface 26. The light of this composite tone-controlled image then passes through the anode 27 and alkali halide 25.

The control electrode 18 (electron gun 13) is connected to the reeciver by the conductor 31, and the control electrode 22 (electron gun 14) is connected to a frequency generator FG by means of the conductor 32; this frequency generator cyclically generates frequencies of periodicities in three successive levels.

Coloration is obtained by the broad electron beam repeatedly moving upwardly over the target surface 25, in synchrony with each color phase of the scanning electron beam in the gun 13; the electron beam in the gun 14 is cyclically impressed with three different orders of frequency periodicities, one different order of periodicity for each color phase, thus creating three different orders of light wave interference in the screen 25, of the emergent light of the composite black and white image in passing therethrough.

This cycle of scanning is thereafter repeated in an orderly manner to selectively permit, by means of the three orders of light wave interferences, the passage through the screen 25, 27, of the light of the image formed on the anode 26, resulting in the brightness and hues of the three primary colors. In this process, three partial images in red, green and blue, respectively, are reproduced to blend into one composite image representative of the televised scene, and the inverted image is projected onto the spatially positioned viewing screen 34, by means of the objective lens 15, positioned in front of the cathode ray tube 12.

In the event of the desired reproduction of monochrome images, a suitable operable switching means 28' may be set so as to disconnect the frequency generator FG, thus permitting the reproduced black and white image to be projected onto the viewing screen 34.

In Fig. 2, there is shown the control electrode 22 and the horizontal narrow elongated aperture 22'.

Fig. 3 shows a diagrammatic sectional view of the same electrode 22, aperture 22', and the triangular electron beam impinging onto the surface of the alkali halide 25.

The principle of operation is as follows:

Again referring to Fig. 1, white light from the source 10 is formed into a light beam by the condensers 11, and normal to the tube 12, and incident to the two alkali halide screens 24, 25. A single electron beam generated in the gun 13 is modulated with the signal components of red, of a received tri-chromatic color-controlled video signal represenative of the elemental areas of colored objects lying along each scan line of a televised scene. As the scanning beam traverses from point to point elemental areas along the bottom first scan line of the target surface 24, variable density elemental areas are caused to be effected therethrough.

Simultaneously, the electron beam in the gun 14 is impressed with frequency P1, and begins to scan upwardly in synchrony with the color-controlled modulated scanning beam in the gun 13. Electrons enter into the screen 25, and these electrons or electrons released therefrom or both are then drawn to the anode 27. These electrons absorb energy from the light incident to the screen 25, and create light wave interference of one order of the light passing therethrough. The frequency periodicity imparted to the broad electron beam impinging upon the target surface of the halide screen 25, causes a series of bands of spaced electrons to propagate toward the anode 27, and then disappear. These bands of spaced electrons cause light interference such that they occlude light other than a selected or desired wave length, in this instance resulting in the hue of red. As both electron beams complete the scansions of the target screens 24, 25, a partial image in red is formed.

Upon the completion of the first scansion cycle, both electron beams return to their respective starting positions and as they start the next scansions upwardly, the electron beam in the gun 13 is modulated with the green signal components of the color-controlled video signal. Simultaneously the electron beam in the gun 14 is altered to a different frequency P2, and upon impinging the screen 25, a series of differently spaced bands of electrons move through the alkali halide towards the anode 27 and then disappear. Again these bands of differently spaced electrons cause light interference of a different order such that they occlude light other than a desired wave length, in this instance resulting in the hue of green, thus forming a partial image of this color.

Upon the completion of the second scansion cycle, both electron beams again return to their respective starting positions and as they start the next scansions upwardly, the electron beam in the gun 13, is modulated with the blue signal components of the tri-chromatic video signal and the electron beam in gun 14 is impressed with a different frequency, P3, and upon impinging the screen 25, a series of differently spaced bands of electrons move through the halide towards the anode 27 and then disappear. Again these bands of differently spaced electrons cause a different order of light interference such that they occlude light other than a desired wave length, in this instance yielding the hue of blue, thus resulting in a partial image of this color.

This cycle of scanning is thereafter repeated in an orderly manner to selectively permit by means of the three orders of light wave interferences, the passage through the screen 25, 27, of the light of the image formed on the anode 26, resulting in the brightness and hues of the three primary colors. In this process, three partial images in red, green and blue, respectively, are reproduced to blend into one composite image representative of the televised scene, and the inverted image is projected onto the spatially positioned viewing screen 34, by means of the objective lens 15, positioned in front of the cathode ray tube 12.

For the reproduction of monochrome images, the switch 28' is operably set so as to disconnect the frequency generator to permit the reproduction of black and white images. The receiver 28 may include scanning generators such that conventional monochrome images may be reproduced and projected onto the viewing screen.

It is understood that various alterations and modifications of the present invention may become apparent to those skilled in the art, and it is desirable that any and all alterations and modifications be considered within the purview of the present invention except as limited by the hereinafter appended claims.

I claim:

1. In combination, a source, of white light, a receiver having a color image reproducing tube, and a spatially positioned viewing screen, said tube employing a pair of alkali halide screens, one surface of each serving as a target surface and having upon their opposite sides a transparent metal anode to which is applied a suitable positive potential, each said screens being in the path of separate electron beams, means to direct light from said source through said screens, means to cyclically modulate one of said electron beams with each of the different color phase components of a tri-chromatic video signal to reproduce on the incident halide screen a composite monochrome image, means to cyclically impart to the associated electron beam N periodicity impingement levels, one different impingement level for each of said color phases, means to scaningly direct said meam over the target surface of the incident screen in synchrony with the modulated scanning beam to obtain of the modulated white light passing therethrough a composite colored image, and means to project said image onto the viewing screen.

2. In combination, a receiver having a color image reproducing tube, a source of white light, means to direct light therefrom through the tube and onto a spatially positioned viewing screen, said tube employing an image reproducing alkali halide screen incident to the light, one surface serving as the target surface and having upon the opposite side a transparent metal anode to which is applied a suitable positive potential, said screen being in association with an electron gun for producing a scanning electron beam, and a similar alkali halide screen adapted to separate colors from light emergent from the first-mentioned halide screen, and a second electron gun for producing a scanning electron beam for impingement over the target surface of the second-mentioned halide screen; means to modulate the first-mentioned electron beam with each successive color phase components of a tri-chromatic video signal to reproduce on the incident halide screen a composite image having the tone values of the video signal, means to scan the second-mentioned electron beam at cyclically different constant perodicities over the surface of the incident target surface, each periodicity in synchrony with each color phase to produce a natural colored image of said composite image and means to project said image onto the viewing screen.

3. In combination, a source of white light, a receiver having a color image tube, and a spatially positioned viewing screen, said tube employing a first electron gun for producing a scanning electron beam for impingement upon an alkali halide screen, one surface serving as the target side and having upon the opposite surface a transparent anode to which is applied a suitable positive potential, and a second electron gun in association with a similar alkali halide screen; means to direct light from said source through the two alkali halide screens, means to modulate the first electron beam with different successive color phases of a tri-chromatic color-controlled video signal to reproduce on the incident halide screen a composite tone-controlled image and means for interrupting the second electron beam at N constant frequency periodicities cyclic levels, means to scanningly direct said electron beam over the surface of the incident halide screen, each periodicity level scanning in synchrony with each different color phase scanning of the modulated electron beam, to obtain of light entering therein N different orders of light wave interferences in said screen, each order of light wave interference occluding light other than a predeterminedly desired wave length to produce N differently colored partial images to blend into a composite colored image and means to project the colored image onto said spatially positioned viewing screen.

4. In combination, a source of white light, a receiver having a color image reproducing electronic device, and a spatially positioned viewing screen, said device employing a pair of alkali halide screens, one surface of each serving as a target surface and having upon their opposite sides a transparent metal anode to which is applied a suitable positive potential, each said screens being in the path of separate electron beams, means to direct light from said source through said screens, means to cyclically modulate one of said electron beams with each of the different color phase components of a tri-chromatic video signal to reproduce on the incident halide screen N successive groups of tone-controlled partial images in sequential order, means to cyclically impart to the associated electron beam N constant periodicity impingement levels, one different impingement level for each of said color phases, means to scanningly direct said beam over the target surface of the incident screen, each of the different impingement levels diffracting a different hue from each of said partial images to differently color each partial image on the screen anode in successive cyclic orders, the differently colored partial images blending into N successive composite natural colored images, and means to direct said successive images onto the viewing screen.

5. In combination, a receiver having a color image reproducing electronic device, a source of white light, means to direct light therefrom through said device and onto a spatially positioned viewing screen, said device employing an image reproducing alkali halide screen incident to the light, one surface serving as the target surface and having upon the opposite side a transparent metal anode to which is applied a suitable positive potential, said screen being in association with an electron gun for producing a scanning electron beam, and a similar alkali halide screen adapted to separate colors from light emergent from the first-mentioned halide screen, and a second electron gun for producing a scanning electron beam for impingement over the target surface of the second mentioned halide screen; means to modulate the first mentioned electron beam with each of the successive color phase components of a tri-chromatic video signal train to reproduce on the incident halide screen N sets of tone-controlled partial images having the tone values of the video signal, means to scan the second mentioned electron beam at cyclically different periodicities impingement levels over the surface of the incident target surface, each periodicity in synchrony with each color phase, each of the different impingement levels diffracting a different hue from each of said partial images to differently color each partial image on the screen anode in successive cyclic orders, the differently colored partial images blending into N successive composite natural colored images and means to direct said successive images onto the viewing screen.

6. In combination, a source of white light, a receiver having a color image electronic device, and a spatially positioned viewing screen, said device employing a first electron gun for producing a scanning electron beam for impingement upon an alkali halide screen, one surface serving as the target side and having upon the opposite surface a transparent anode to which is applied a suitable positive potential, and a second electron gun in association with a similar alkali halide screen; means to direct light from said source through the two alkali halide screens, means to modulate the first electron beam with different successive color phases of a tri-chromatic video signal to reproduce on the incident halide screen N sets of tone-controlled partial images and means for interrupting the second electron beam at N constant frequency periodicities cyclic levels, means to scanningly direct said second electron beam over the surface of the incident halide screen, each periodicity level scansion in synchrony with each different color phase scansion of the modulated electron beam to obtain of light entering therein N cyclic orders of different light wave interferences in said screen, each order of light wave interference occluding light other than a predeterminedly desired wave length, each of said wave length differently coloring each partial image, said partial images blending into N successive composite colored images and means to project the colored images onto said spatially positioned viewing screen.

7. The method of reproducing color television images, which consists in producing white light, scanning a color-controlled electron beam over an alkali halide target screen, directing the white light therethrough, cyclically reproducing N sets of differently tone-controlled partial images, passing the light of said images through a second alkali halide screen, scanning the target surface of said second alkali halide screen with an electron beam, cyclically imparting to said electron beam N different constant frequency periodicities, the periodicities differing from each other for each color phase, producing different orders of light wave interferences in said halide, each different order of light wave interference differently diffracting the light passing therethrough, each order of diffraction differently coloring each of said tone-controlled partial images, said differently colored partial images blending into N successive composite color-controlled images, applying a positive potential to the opposite sides of the target screens, and directing the color-controlled television images onto a spatially positioned viewing screen.

References Cited in the file of this patent

UNITED STATES PATENTS

| Number | Name | Date |
|---|---|---|
| 2,330,172 | Rosenthal | Sept. 21, 1943 |
| 2,386,074 | Sziklai | Oct. 2, 1945 |
| 2,577,756 | Harrington | Dec. 11, 1951 |

FOREIGN PATENTS

| Number | Country | Date |
|---|---|---|
| 578,423 | Great Britain | June 27, 1946 |